(12) United States Patent
Sorensen et al.

(10) Patent No.: US 12,018,642 B2
(45) Date of Patent: Jun. 25, 2024

(54) WIND TURBINE ROTOR BLADE ELEMENT HAVING CONNECTION ASSEMBLIES

(71) Applicants: Nordex Energy SE & Co. KG, Hamburg (DE); Nordex Blade Technology Centre ApS, Stenstrup (DK)

(72) Inventors: Flemming Sorensen, Svendborg (DK); Tim Berend Block, Henstedt-Ulzburg (DE)

(73) Assignees: Nordex Energy SE & Co. KG, Hamburg (DE); Nordex Blade Technology Centre APS, Stenstrup (DK)

( * ) Notice: Subject to any disclaimer, the term of this patent is extended or adjusted under 35 U.S.C. 154(b) by 0 days.

(21) Appl. No.: 18/348,969

(22) Filed: Jul. 7, 2023

(65) Prior Publication Data

US 2023/0349356 A1    Nov. 2, 2023

Related U.S. Application Data

(62) Division of application No. 17/749,947, filed on May 20, 2022, now Pat. No. 11,732,688.

(30) Foreign Application Priority Data

May 21, 2021    (EP) .................................... 21175376

(51) Int. Cl.
*F03D 1/06* (2006.01)
*B29C 70/88* (2006.01)
(Continued)

(52) U.S. Cl.
CPC .......... *F03D 1/0675* (2013.01); *B29C 70/885* (2013.01); *F03D 1/0658* (2013.01);
(Continued)

(58) Field of Classification Search
CPC ...... F03D 1/0658; F03D 1/0675; F03D 13/10; F05B 2240/30; F05B 2260/30; F05B 2280/6003; B29C 70/885; B29L 2031/085
See application file for complete search history.

(56) References Cited

U.S. PATENT DOCUMENTS 6,371,730 B1 * 4/2002 Wobben ................ F03D 7/0224
                                                          416/204 R
8,133,029 B2    3/2012 Quell et al.
(Continued)

FOREIGN PATENT DOCUMENTS

DE    10 2011 051 172 A1    12/2012
DE    10 2013 003 634 A1    9/2014
(Continued)

*Primary Examiner* — Sang K Kim
(74) *Attorney, Agent, or Firm* — Walter Ottesen, P.A.

(57) ABSTRACT

A wind turbine rotor blade element includes a connection section with a front face, an inner and an outer surface. A plurality of connection assemblies each have (i) a metal insert with a longitudinal axis, a circumferential outer surface and a joining portion for connecting the rotor blade to a wind turbine rotor hub; and, (ii) a transition material aligned with the metal insert and having a tapering longitudinal section. The longitudinal section has an axial outer surface parallel to the longitudinal axis of the metal insert and an inclined outer surface at an angle with reference to the longitudinal axis. The connection assemblies are embedded in the connection section such that the joining portions of the metal inserts are accessible. The connection assemblies are arranged in an inner row closer to the inner surface of the connection section and an outer row closer to the outer surface thereof.

13 Claims, 6 Drawing Sheets

(51) Int. Cl.
  *F03D 13/10*         (2016.01)
  *B29L 31/08*         (2006.01)
(52) U.S. Cl.
  CPC ........ *F03D 13/10* (2016.05); *B29L 2031/085* (2013.01); *F05B 2230/60* (2013.01); *F05B 2240/301* (2013.01); *F05B 2260/30* (2013.01); *F05B 2280/6003* (2013.01)

(56) References Cited

U.S. PATENT DOCUMENTS

| | | | |
|---|---|---|---|
| 9,790,918 B2 | 10/2017 | Feigl | |
| 9,995,271 B2* | 6/2018 | Dahl | F03D 1/0658 |
| 10,309,369 B2 | 6/2019 | Dahl et al. | |
| 11,530,679 B2* | 12/2022 | Smith | F03D 1/0658 |
| 2009/0324420 A1* | 12/2009 | Arocena De La Rua | B29D 99/0025 |
| | | | 264/274 |
| 2014/0140853 A1* | 5/2014 | Feigl | F03D 1/0658 |
| | | | 416/222 |
| 2014/0334934 A1 | 11/2014 | Kannenberg et al. | |
| 2016/0341176 A1 | 11/2016 | Shaik | |
| 2017/0002660 A1 | 1/2017 | Samudrala et al. | |
| 2017/0138342 A1 | 5/2017 | Hoffmann | |
| 2018/0372062 A1 | 12/2018 | Messmer et al. | |
| 2020/0263658 A1 | 8/2020 | Madsen et al. | |
| 2022/0034292 A1 | 2/2022 | Rubner et al. | |

FOREIGN PATENT DOCUMENTS

| | | |
|---|---|---|
| EP | 2 558 716 B1 | 2/2013 |
| EP | 2 746 572 A2 | 6/2014 |
| EP | 3 019 316 B1 | 5/2016 |
| EP | 3 120 017 B1 | 1/2017 |
| GB | 2524489 A | 9/2015 |
| WO | 2017/215735 A1 | 12/2017 |

\* cited by examiner

WIND TURBINE ROTOR BLADE ELEMENT HAVING CONNECTION ASSEMBLIES

CROSS-REFERENCE TO RELATED APPLICATIONS

This application is a divisional application of U.S. patent application Ser. No. 17/749,947, filed May 20, 2022, which claims priority of European patent application no. 21 175 376.9, filed May 21, 2021, the entire contents of both applications are incorporated herein by reference.

TECHNICAL FIELD

The disclosure relates to a wind turbine rotor blade element including a plurality of metal inserts embedded in a connection section of the wind turbine rotor blade element such that joining portions of the metal inserts are accessible from a front face of the connection section. Wind turbine rotor blade elements of this type are used for connecting a wind turbine rotor blade to a hub of a wind turbine, or for connecting two longitudinal sections of a wind turbine rotor blade to one another.

BACKGROUND

From the document US 2017/0138342 a wind turbine rotor blade with a single metal insert including a plurality of threaded bores has become known. The metal insert has a complex shape with two concentric ring-shaped members facing a connection surface and including the threaded bores, and a plurality of rearward-facing tongues adapted to be integrated into a blade laminate.

From the document DE 10 2011 051 172 A1 a wind turbine rotor blade with a plurality of metal inserts integrated in a blade laminate has become known. Each insert has a threaded bore and an outer surface having a rough texture with protrusions. Positioned around the insert, there is a fiber tube configured to tighten when under tension. A pultruded profile is fastened to a distal end of the insert and placed within the fiber tube in order to maintain the fiber tube in position during assembly. The metal insert and/or the pultruded profile taper towards a distal end in a symmetrical manner. In one embodiment, the metal inserts with fiber tubes and pultruded profiles are arranged in two concentric rings at a rotor blade root.

From the document EP 2 746 572 A2, a wind turbine rotor blade has become known having a blade root portion with shall be fastened to a wind turbine rotor hub in an indirect manner. To this end, external structural connection supports are attached to an inner or outer surface of the blade root portion, and connected to the wind turbine rotor blade hub.

From the document WO 2017/215735 A1 a wind turbine rotor blade element has become known.

SUMMARY

It is an object of the disclosure to provide a wind turbine rotor blade element with a connection section including a plurality of connection assemblies, the wind turbine rotor blade element being easy to manufacture and offering improved load bearing capabilities.

This object can, for example, be achieved via a wind turbine rotor blade element having:

a rotor blade body having a connection section defining a front face, an inner surface and an outer surface;

the inner surface and the outer surface conjointly defining a wall thickness therebetween;

a plurality of connection assemblies arranged in the connection section; each one of the connection assemblies including:

(i) a metal insert defining a longitudinal axis and having a circumferential outer surface and a joining portion for connecting the wind turbine rotor blade element to one of a wind turbine rotor hub or another wind turbine rotor blade element; and, (ii) a transition material generally aligned with the metal insert and having a tapered longitudinal section defining an axial outer surface parallel to the longitudinal axis of the metal insert and the tapered longitudinal section further defining an inclined outer surface at an acute angle with respect to the longitudinal axis of the metal insert;

the plurality of connection assemblies being embedded in the connection section so as to cause the joining portions of the metal inserts to be accessible from the front face of the connection section;

the connection assemblies being arranged in an inner row closer to the inner surface of the connection section and an outer row closer to the outer surface of the connection section and so as to cause the inclined outer surface of the transition material of the connection assemblies of both the inner row and the outer row to contribute to a decrease in wall thickness of the connection section;

an outer prefabricated part comprising a cured plastics material in which is embedded a plurality of the connection assemblies of the outer row and an inner prefabricated part comprising a cured plastics material in which is embedded a plurality of the connection assemblies of the inner row; and, the inner prefabricated part and the outer prefabricated part being mutually connected by an adhesive bond.

The connection section is configured for connecting the wind turbine rotor blade element to another part, in particular to a wind turbine rotor hub or to another wind turbine rotor blade element. When connected to the other part, the front face of the connection section will face the other part, in particular the front face may abut a connection surface of the other part, for example a flange member of a pitch bearing or a front face of a connection section of another wind turbine rotor blade element. When the other part is a wind turbine rotor hub, the front face may form essentially a circular ring or a segment of a circular ring with an essentially constant width corresponding to the wall thickness of the connection section. When the other part is another wind turbine rotor blade element, in particular another longitudinal section of a wind turbine rotor blade element, the front face may depart from a circular shape and may essentially follow an aerodynamic profile of the wind turbine rotor blade. In both cases, the wall thickness may decrease with growing distance from the front face. The outer surface may be an aerodynamic surface of the wind turbine rotor blade element.

The metal insert may have a generally cylindrical shape. It may be a sleeve including, as the joining portion, a threaded bore, or a bolt including, as the joining portion, an outer thread. The circumferential outer surface may be cylindrical, however, it may also have a varying diameter, for example comprising a conical shape. The longitudinal axis of the metal insert may be aligned with a longitudinal direction of the wind turbine rotor blade element and/or a longitudinal direction of the wind turbine rotor blade for which the wind turbine rotor blade element is used. Of course, the wind turbine rotor blade element may include any number of metal inserts, for example arranged side-by-side and/or with parallel longitudinal axes. The metal insert may consist of any suitable metal, in particular of steel or aluminum or an alloy of these and/or other metals.

Each connection assembly has an elongated shape. The transition material is generally aligned with the metal insert. It has a proximal end facing the metal insert and an opposite, distal end. At the proximal end, the transition material may have a cross-section similar to a cross-section of the metal insert, so that it forms a smooth extension of the metal insert. The proximal end of the transition material may abut the metal insert, and/or may be attached thereto. For example, the metal insert may have recess into which the proximal end of the transition material is fitted. The recess may be, for example, cone-shaped, and the proximal end may have a complementary shape. The tapering longitudinal section of the transition material extends towards the distal end and has an axial outer surface positioned parallel to the longitudinal axis of the metal insert and an inclined outer surface positioned at an angle with reference to the longitudinal axis. The angle may be in a range of about 5° to about 35°, so the cross-sectional dimensions of the transition material decrease smoothly towards the distal end. Through this geometry, the transition material helps to achieve a smooth load transfer between the metal insert and the surrounding structure of the wind turbine rotor blade element. The surrounding structure may include a fiber reinforced plastics material, in particular a laminate. The connection assemblies are embedded in the connection section. Each connection assembly forms an integral part of the wall thickness of the connection section.

In accordance with the disclosure, the connection assemblies are arranged in an inner row and an outer row. As compared to a connection section including only a single row of connection assemblies, this increases the load bearing capabilities when the dimensions of the connection assemblies are maintained. Both rows may contain the same or almost the same number of connection assemblies, however, it is also possible to use different numbers of connection assemblies for both rows. Each row may extend over the entire circumference of the connection section, such that it forms a closed ring (which may or may not be circular). However, the inner row and/or the outer row may extend over a circumferential section of the connection section only, for example, for reinforcing the angular segments subject to the highest loads.

When integrating metal inserts into a wind turbine blade element, great care must be taken to fulfil all requirements with regard to a reliable load transfer between the metal insert and the surrounding structure. It is essential not only to obtain a strong bond at the metal insert's outer surface, but also to adapt the surrounding structure to transfer the loads into the remainder of the wind turbine rotor blade. This is particularly difficult when arranging the metal inserts in two rows, because the connection section must have a relatively large wall thickness to accommodate the adjacent connection assemblies, wherein this wall thickness cannot be maintained over a longer longitudinal section. In accordance with the disclosure, a smooth load transfer is obtained by arranging the connection assemblies such that the inclined outer surfaces of the transition materials of the connection assemblies of both the inner row and the outer row contribute to a decrease in wall thickness of the connection section. In this manner, the wall thickness is reduced to an extent suitable to compensate for the extra-thickness added by the adjacent rows of metal inserts.

Further, it is possible to use connection assemblies of known and proven structure, which are easy to manufacture and can be integrated in the wind turbine rotor blade element using proven techniques.

According to an aspect, the transition material includes a core material, in particular a wooden material or a foamed material. When using such a lightweight core material, the primary function of the transition material is to hold a surrounding structural material in position during manufacture and operation of the wind turbine blade element. In addition, the core material provides stability against bending deformation as well as buckling failure locally in the structure.

According to an aspect, the transition material includes a fiber reinforced plastics material, in particular a pultruded material. In this configuration, the transition material itself may contribute to the transfer of loads, possibly in combination with a surrounding structural material.

According to an aspect, each connection assembly has at least one layer of a fiber material surrounding the metal insert and the transition material, the at least one layer of fiber material in particular being wrapped around the metal insert and the transition material. In this aspect, the connection assemblies can form prefabricated units before being integrated into the wind turbine blade element. The important interface between the metal insert and the surrounding structural material, which is formed at least in part by the at least one layer of fiber material, can be controlled carefully. The at least one layer of fiber material may include a layer of unidirectional fibers, in particular aligned with the longitudinal axis of the metal insert.

According to an aspect, the transition material of each of the connection assemblies of either the inner row or the outer row includes a cylindrical section arranged between the metal insert and the tapering longitudinal section, wherein the tapering longitudinal sections of the connection assemblies of the other row are positioned such that their axial outer surfaces are each facing an adjacent cylindrical section. By this specific arrangement, the wall thickness decrease obtained by the tapering sections can be staggered. In a longitudinal section of the connection section including the cylindrical sections, the wall thickness is decreased in accordance with the inclined surfaces of the transition material of the connection assemblies of the other row (not having the cylindrical sections). In an adjacent longitudinal section, the wall thickness is decreased in accordance with the inclined surfaces of the transition material of the connection assemblies of the row having the cylindrical sections.

According to an aspect, the inclined outer surface of a connection assembly of the outer row and the inclined outer surface of an adjacent connection assembly of the inner row are arranged in a common plane. This helps to achieve a smooth load transfer, in particular based on a structural material arranged next to the inclined surfaces and extending parallel to the common plane.

According to an aspect, the inclined outer surfaces of the connection assemblies of the inner row are facing the inner surface of the connection section and the inclined outer surfaces of the connection assemblies of the outer row are facing the outer surface of the connection section. By this specific arrangement, the wall thickness decrease obtained by the tapering sections may be arranged symmetrically or almost symmetrically with reference to a center line of the wall thickness. The inclined outer surfaces of the connection assemblies of both rows may be arranged in the same longitudinal section of the wind turbine rotor blade element.

According to an aspect, the wind turbine rotor blade element is a spar cap, a shell member or a longitudinal section of a spar cap or of a shell member, or a prefabricated connection part adapted to be integrated into a wind turbine rotor blade. In general, the wind turbine rotor blade element may be an essentially complete wind turbine rotor blade or any part or section thereof, for example a pressure side-half shell, a suction side-half shell, a section of a wind turbine rotor blade divided into two or more longitudinal sections, or a segment or part of such a section. The wind turbine rotor blade element may extend over the entire length of the wind turbine rotor blade (from a wind turbine rotor blade root to a wind turbine rotor blade tip), or only over a section of this length. This section may include either the wind turbine rotor blade root or the wind turbine rotor blade tip or none of them. The wind turbine rotor blade element may include an outer surface that forms an aerodynamic surface of the wind turbine rotor blade, for example if the wind turbine rotor blade element is a wind turbine rotor blade half shell. In the alternative, the wind turbine rotor blade element may be an inner reinforcing member of a wind turbine rotor blade, such as a spar or spar cap or a longitudinal section thereof, or a ring-shaped or ring-section-shaped reinforcing member to be integrated into a wind turbine rotor blade root or adjacent to a segmentation plane of a wind turbine rotor blade divided into two or more longitudinal sections.

According to an aspect, the wind turbine rotor blade element includes a prefabricated part including a cured plastics material in which is embedded one of the following groups of elements, in particular in combination with further fiber materials: (i) a plurality of the connection assemblies of the inner row, (ii) a plurality of the connection assemblies of the outer row, (iii) a plurality of the connection assemblies of both the inner row and the outer row, (iv) all of the connection assemblies. By combining several or even all of the connection assemblies into a prefabricated part, the manufacturing process can be made easier. In particular, the most critical steps can be carried out under controlled conditions. When manufacturing the wind turbine rotor blade element, at least one of these prefabricated parts may be placed in a mould together with any other components of the wind turbine rotor blade element, and the wind turbine rotor blade element may be completed using any suitable technique, for example a vacuum infusion process.

According to an aspect, the wind turbine rotor blade element includes an outer prefabricated part including a cured plastics material in which is embedded a plurality of the connection assemblies of the outer row and an inner prefabricated part including a cured plastics material in which is embedded a plurality of the connection assemblies of the inner row, wherein the inner prefabricated part and outer prefabricated part are connected to each other by an adhesive bond. This may be done by placing the inner prefabricated part and the outer prefabricated part in a mould together with any other components of the wind turbine rotor blade element, and by forming the adhesive bond via any suitable technique including e.g. a vacuum infusion process. However, it is an option to manufacture a component of the wind turbine rotor blade element including the inner prefabricated part or outer prefabricated part only (and possibly any other materials such as further fiber materials, et cetera) and to form the adhesive bond later outside of this mould.

In general, all connection assemblies and/or all metal inserts may have the same dimensions. According to an aspect, the metal inserts of the connection assemblies of the inner row have an outer diameter which is smaller than an outer diameter of the metal inserts of the connection assemblies of the outer row. The difference in size of the outer diameters may be in a range of about 1% to about 15%, in particular corresponding to a difference between the circumference of the inner row and the circumference of the outer row. In this case, spacing between adjacent metal inserts within the inner row and within the outer row as well as the number of connection assemblies in both rows can be roughly or exactly the same. If desired, the joining portions of both types of metal inserts (of the inner row and of the outer row) may be the same, so that identical joining elements (for example threaded bolts) may be used for both rows.

According to an aspect, at least one layer of a triaxial fiber mat is arranged at the outer surface of the connection section and/or at the inner surface of the connection section, and/or between the connection assemblies of the outer row and the connection assemblies of the inner row. The at least one layer of a triaxial fiber mat provides a reinforcing structure for the arrangement of connection assemblies.

According to an aspect, an intermediate laminate is arranged between the connection assemblies of the outer row and the connection assemblies of the inner row, wherein the intermediate laminate has a thickness in a range of 10% to 50% of an outer diameter of the metal inserts. The intermediate laminate may be formed from multiple layers of a triaxial fabric and/or of unidirectional fibers. It was found that an intermediate laminate of significant thickness helps to form a strong structure being capable of transferring loads from both rows of metal inserts.

According to an aspect, a spacer element is arranged between three adjacent connection assemblies and/or between the inner surface of the connection section and two adjacent connection assemblies of the inner row and/or between the outer surface of the connection section and two adjacent connection assemblies of the outer row. Spacer elements arranged at the mentioned positions help to avoid a formation of resin nests or voids between the structural layers. To this end, the spacer elements may be made of a lightweight core material. In addition, it is an option to use a spacer element made of a structurally relevant material, in particular a material comprising reinforcing fibers aligned with a longitudinal axis of the spacer element and/or of the metal insert. Suitable materials are e.g. layers of a unidirectional fiber material formed in rolls, either in dry or cured form, and pultruded profiles of a fiber material. In particular, prefabricated spacer elements may be used, that is spacer elements comprising reinforcing fibers (which can preferably be aligned with a longitudinal axis of the spacer element) embedded in a cured plastics material.

According to an aspect, the spacer element has a triangular cross section. The edges of the triangular cross section may be straight lines, but they may also include some curvature, in particular to match a circular circumference of an adjacent connection assembly.

According to an aspect, the transition material has a conical proximal end fitted into a complementary opening of the metal insert. This makes it easy to assemble the metal insert and the transition material in the desired relative position, and may also allow for a direct load transfer between these two elements.

BRIEF DESCRIPTION OF DRAWING

The invention will now be described with reference to the drawings wherein.

DETAILED DESCRIPTION

Figure 1:
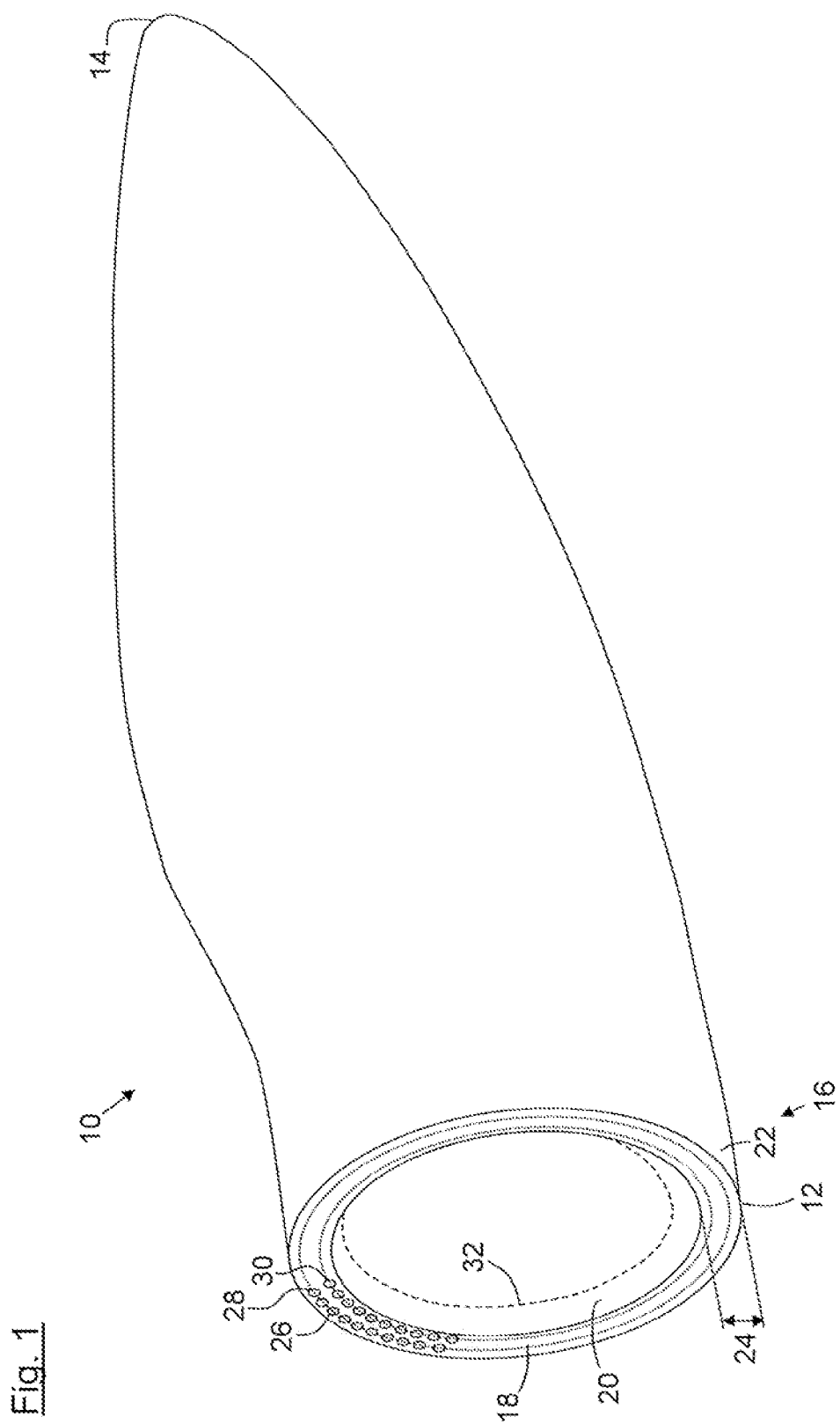
FIG. 1 is a wind turbine rotor blade in a schematic, perspective view.

FIG. 1 shows a wind turbine rotor blade element 10 corresponding to an entire wind turbine rotor blade (not drawn to scale), having a blade root 12 and a blade tip 14. At the blade root 12, the wind turbine rotor blade element 10 includes a connection section 16 adapted to connect the wind turbine rotor blade element to a wind turbine rotor blade hub which is not shown.

The connection section 16 has a front face 18, an inner surface 20 and an outer surface 22. The distance between the inner surface 20 and the outer surface 22 forms a wall thickness 24. The wall thickness 24 remains essentially constant from the front face 18 up to a first longitudinal position 32, and then decreases smoothly with growing distance from the front face 18.

A plurality of connection assemblies 26 are embedded in the connections section 16 such that a joining portion is accessible from the front face 18. The connection assemblies 26 are positioned in an inner row 30 and an outer row 28. The connection assemblies 26 of the inner row 30 are arranged closer to the inner surface 20 of the connection section 16. The connection assemblies 26 of the outer row are arranged closer to the outer surface 22 of the connection section 16. The connection assemblies 26 are embedded between the inner surface 20 and the outer surface 22 of the connection section 16.

Figure 2:
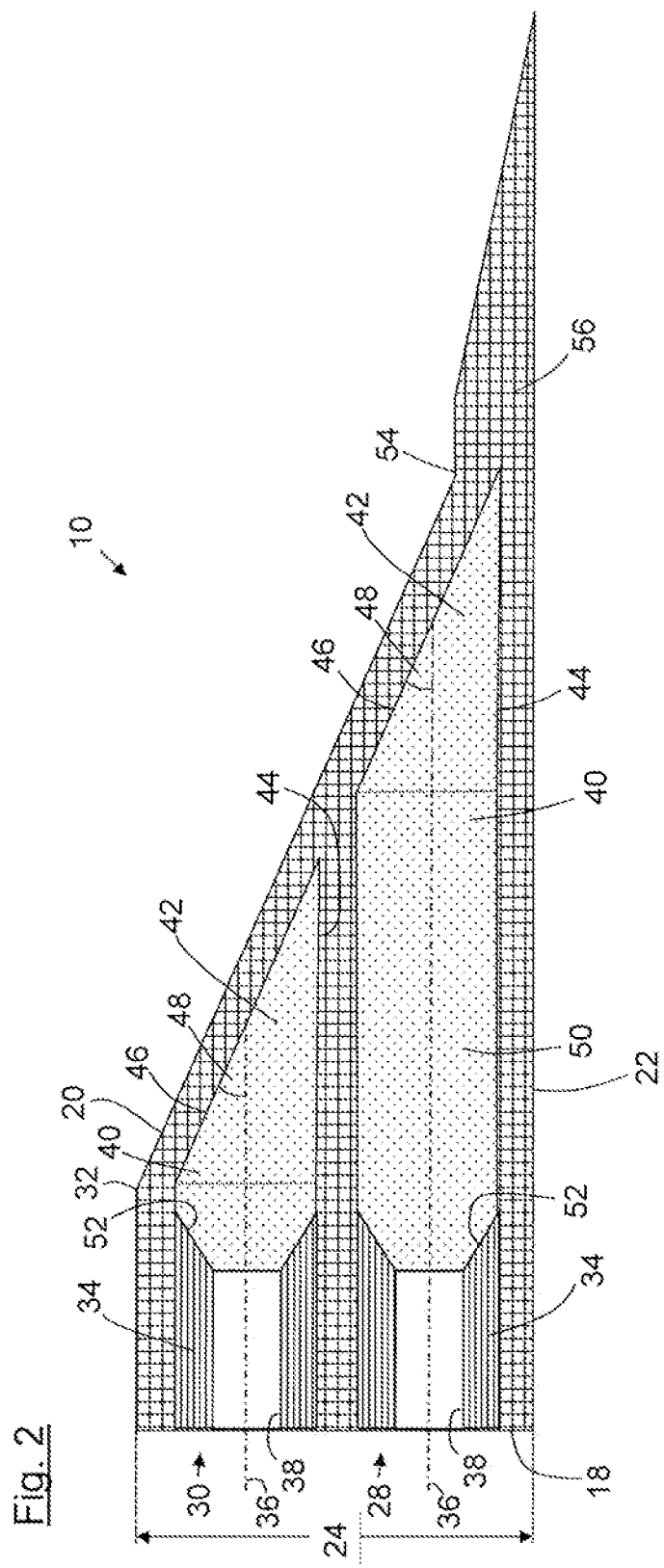
FIG. 2 is a schematic, longitudinal section through a part of the wind turbine rotor blade of FIG. 1.

FIG. 2 shows a wind turbine rotor blade element 10 in a longitudinal section. The wind turbine rotor blade element 10 may be used for the connection section 16 of the wind turbine rotor blade of FIG. 1. The front face 18 is arranged to the left, the outer surface 22 is arranged at the bottom and the inner surface 20 is arranged at the top of FIG. 2. The longitudinal section includes one connection assembly 26 of the inner row 30 and one connection assembly 26 of the outer row 28. In addition, the wind turbine rotor blade element 10 includes various layers of a fiber material 56 arranged at the outer surface 22, at the inner surface 20 and between the connection assemblies 26 of the inner row 30 and of the outer row 28.

Each connection assembly has a sleeve-shaped metal insert 34 defining a longitudinal axis 36 and an inner thread 38 forming a joining portion, and a transition material 40 generally aligned with the metal insert 34.

The transition material 40 of the inner row 30 has a tapering longitudinal section 42, with an axial outer surface 44 positioned parallel to the longitudinal axis 36 of the metal insert 34, and an inclined outer surface 46 positioned at an angle 48 with reference to the longitudinal axis 36. The transition material 40 of the outer row 28 has a tapering longitudinal section 42 as well, and further has a cylindrical longitudinal section 50 arranged between the metal insert 34 and the tapering longitudinal section 42. At a distal end, the metal inserts 34 have a cone-shaped recess 52 into which a complementary proximal end of the adjacent transition material 40 is fitted.

The inclined outer surfaces 46 of the transition materials 40 of the connection assemblies 26 of both the inner row 30 and the outer row 28 contribute to the decrease in wall thickness 24 of the wind turbine rotor blade element 10. To this end, in FIG. 2 both inclined outer surfaces 46 are arranged in a common plane. FIG. 2 shows how the wall thickness 24 decreases smoothly from a first longitudinal position 32, where the tapering longitudinal section 42 of the connection assembly 26 of the inner row 30 begins, to a second longitudinal position 54, where the tapering longitudinal section 42 of the connection assembly 26 of the outer row 28 ends.

Figure 3:
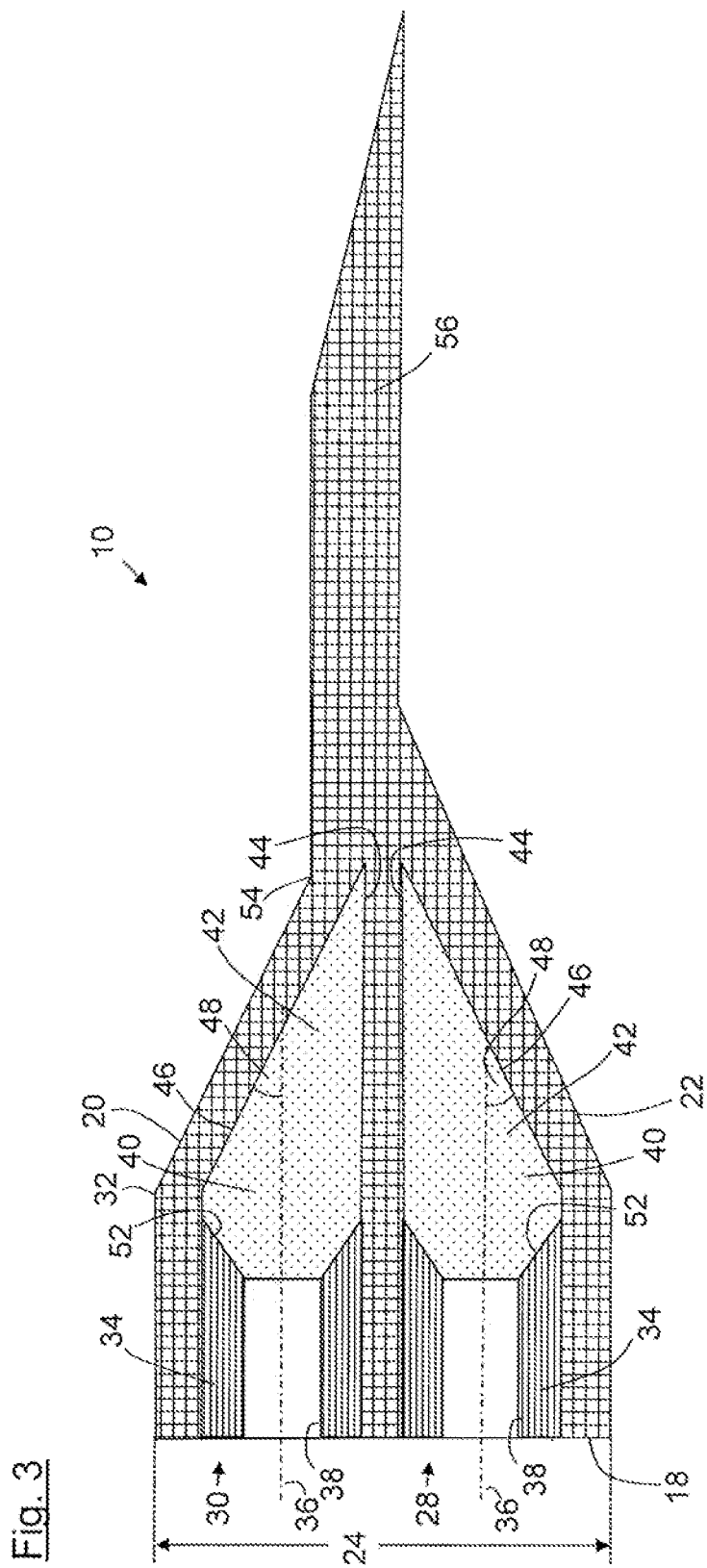
FIG. 3 shows another wind turbine rotor blade element in a schematic, longitudinal section.

FIG. 3 shows another wind turbine rotor blade element in a view similar to the view of FIG. 2. It includes connection assemblies 26 arranged in an inner row 30 and an outer row 28, each connection assembly 26 having a metal insert 34 similar to the ones of FIG. 2. Each connection assembly 26 also includes a transition material 40 having a tapering longitudinal section 42 with an axial outer surface 44 and an inclined outer surface 46. In contrast to FIG. 2, none of the connections assemblies 26 includes a substantial cylindrical section and the tapering longitudinal sections 42 are arranged such that the inclined outer surfaces 46 of the connection assemblies 26 of the inner row 30 are facing the inner surface 20 of the connection section 16 and the inclined outer surfaces 46 of the connection assemblies 26 of the outer row 28 are facing the outer surface 22 of the connection section 16.

In this specific arrangement, both inclined outer surfaces 46 contribute to the decrease in wall thickness 24 between the first longitudinal position 32 and the second longitudinal position 54. This time, both inclined outer surfaces 46 begin at the first longitudinal position 32 and end at the second longitudinal position 54.

Figure 4:
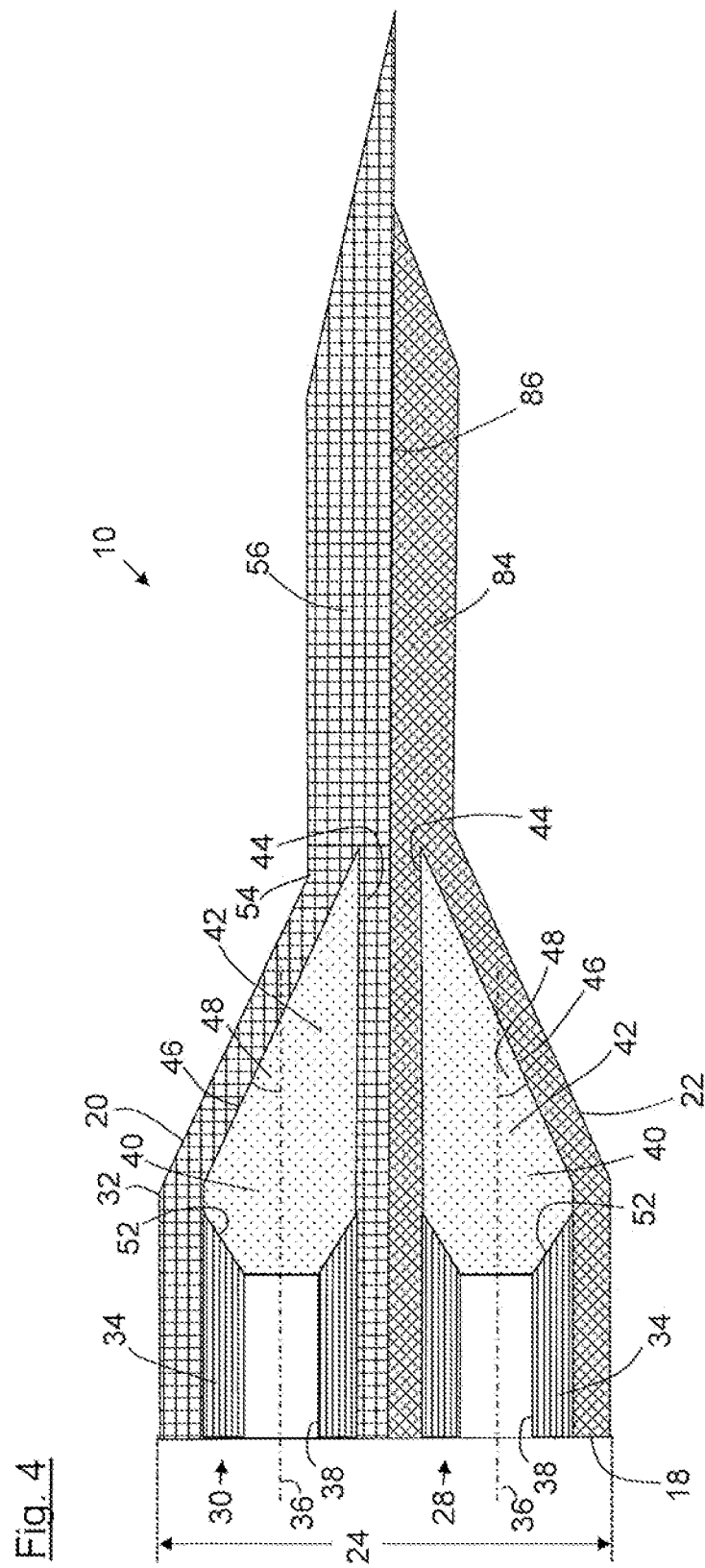
FIG. 4 shows yet another wind turbine rotor blade element in a schematic, longitudinal section.

FIG. 4 shows a wind turbine element including a plurality of connection assemblies arranged similar to those of FIG. 3. However, the connection assemblies 26 of the inner row 30 together with a surrounding fiber material 56 on the one hand and the connection assemblies 26 of the outer row 28 together with a surrounding fiber material 84 on the other hand have been manufactured in separate moulds, and have been joined afterwards via an adhesive bond 86.

Figure 5:
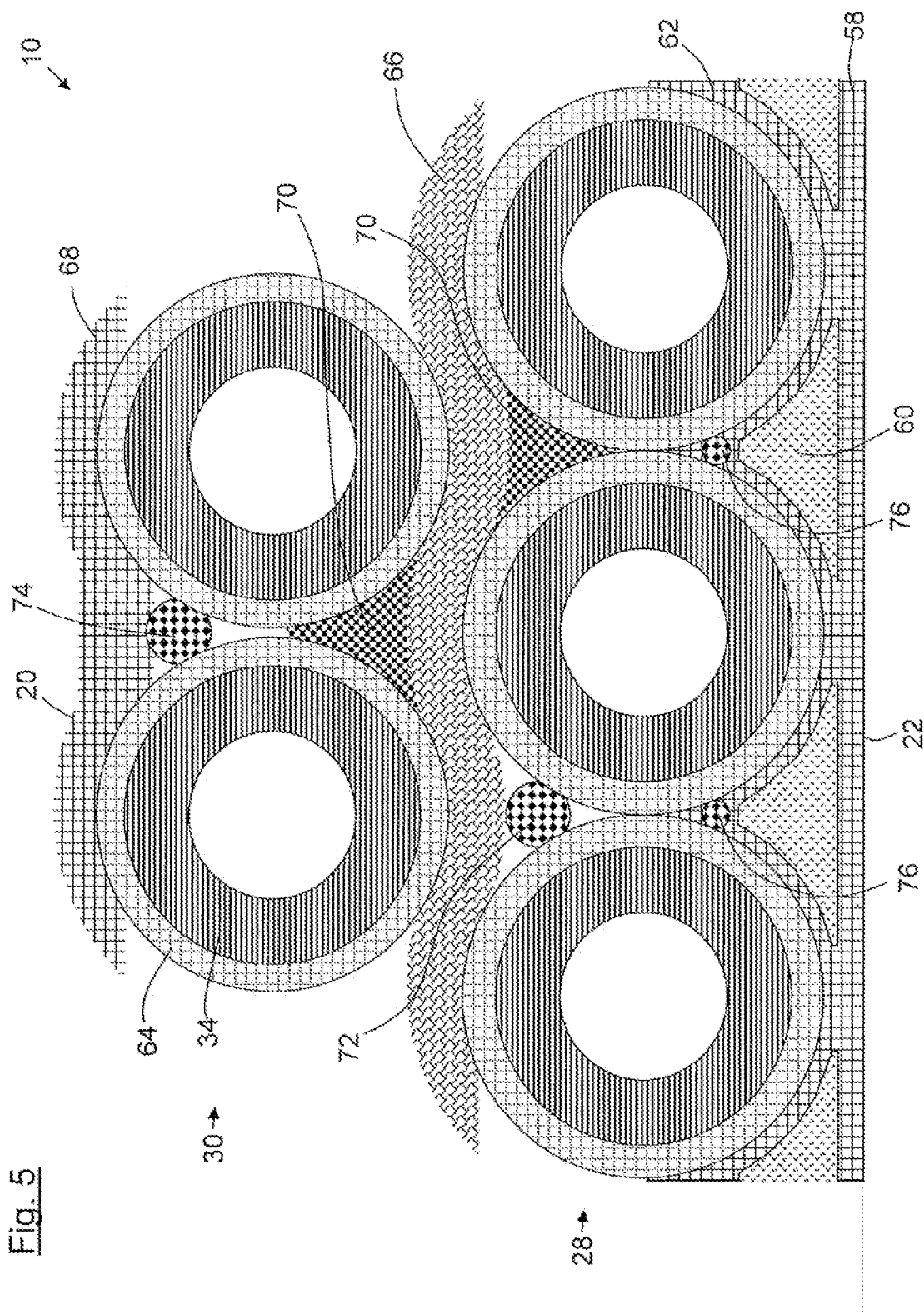
FIG. 5 shows the wind turbine rotor blade element of FIG. 2 in a schematic cross section; and, FIG. 6 shows yet another wind turbine rotor blade element with different prefabricated parts in a schematic cross section.

FIG. 5 shows the wind turbine element 10 of FIG. 2 in cross section. At the outer surface 22, several layers 58 of a triaxial fiber material are arranged. On top of these layers 58 and between each pair of adjacent connection assemblies 26 of the outer row 28, a core material 60 having an essentially triangular shape is placed, covered by further layers 62 of a triaxial fiber material. Each of the connection assemblies 26 is wrapped in several layers 64 of a unidirectional fiber material.

Between the connection assemblies 26 of the outer row 28 and the connection assemblies 26 of the inner row 30, an intermediate laminate 66 is arranged, having an undulated shape and consisting of a combination of several layers of a triaxial fiber material and of a unidirectional fiber material. The inner row 30 of connection assemblies 26 is covered by several layers 68 of a triaxial fiber material forming the inner surface 20.

Two spacer elements 70 having a triangular cross section and a spacer element 72 in the form of a roll of unidirectional fiber material are arranged each between three adjacent connection assemblies 26. A spacer element 74 in the form of a roll of unidirectional fiber material is arranged between the inner surface of the connection section 16 and two adjacent connection assemblies 26 of the inner row 30. Two further spacer elements 76 are arranged between the outer surface 22 of the connection section 16 and two adjacent connection assemblies 26 of the outer row 28.

Figure 6:
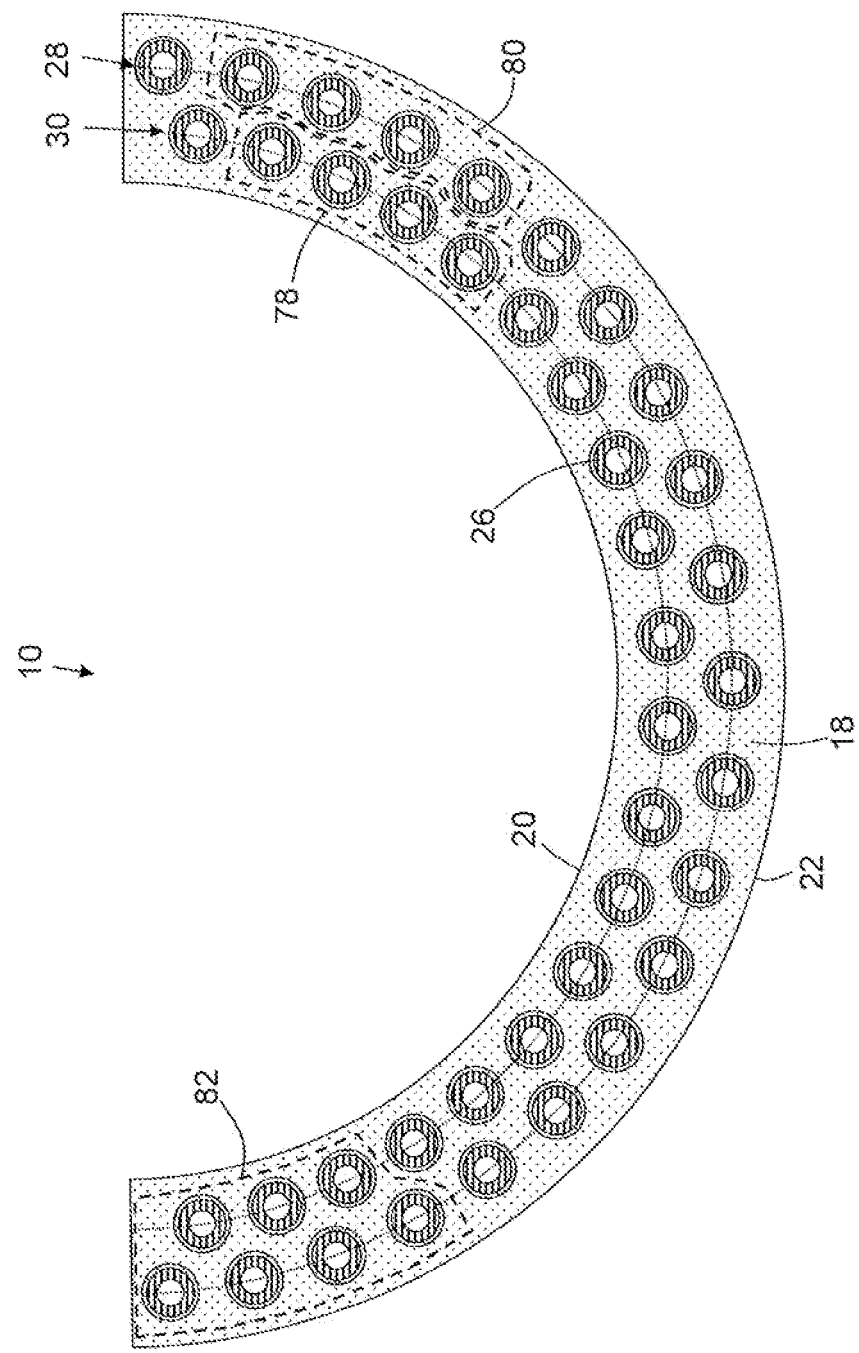

FIG. 6 shows another wind turbine blade element 10 forming a blade root 12 of a wind turbine rotor blade half shell, seen in top view on a front face 18 of a connection section 16. One can see various connection assemblies 26 each including a metal insert 34 and layers 64 of a unidirectional fiber material surrounding the metal inserts 34. The connection assemblies are arranged in an inner row 30 and an outer row 28.

FIG. 6 illustrates different ways for combining a plurality of connection assemblies 26 in a prefabricated part. Each prefabricated part is surrounded by a dashed line. The prefabricated part 78 includes several connection assemblies 26 of the inner row 30 only. The prefabricated part 80 includes several connection assemblies 26 of the outer row 28 only. The prefabricated part 82 includes several connection assemblies 26 of the outer row 28 and several connection assemblies 26 of the inner row 30.

It is understood that the foregoing description is that of the preferred embodiments of the invention and that various changes and modifications may be made thereto without departing from the spirit and scope of the invention as defined in the appended claims.

LIST OF REFERENCE NUMERALS 10 wind turbine rotor blade element
12 blade root
14 blade tip
16 connection section
18 front face
20 inner surface
22 outer surface
24 wall thickness
26 connection assembly
28 outer row
30 inner row
32 first longitudinal position
34 metal insert
36 longitudinal axis
38 inner thread
40 transition material
42 tapering longitudinal section
44 axial outer surface
46 inclined outer surface
48 angle
50 cylindrical longitudinal section
52 cone-shaped recess
54 second longitudinal position
56 fiber material
58 layers of a triaxial fiber material
60 core material
62 layers of a triaxial fiber material
64 layer of a unidirectional fiber material
66 intermediate laminate
68 layers of a triaxial fiber material
70 spacer element
72 spacer element
74 spacer element
76 spacer element
78 prefabricated part
80 prefabricated part
82 prefabricated part
84 fiber material
86 adhesive bond

The invention claimed is:

1. A wind turbine rotor blade element comprising:
a rotor blade body having a connection section defining a front face, an inner surface and an outer surface;
said inner surface and said outer surface conjointly defining a wall thickness therebetween;
a plurality of connection assemblies arranged in said connection section;
each one of said connection assemblies including:
(i) a metal insert defining a longitudinal axis and having a circumferential outer surface and a joining portion for connecting the wind turbine rotor blade element to one of a wind turbine rotor hub or another wind turbine rotor blade element; and,
(ii) a transition material generally aligned with said metal insert and having a tapered longitudinal section defining an axial outer surface parallel to said longitudinal axis of said metal insert and said tapered longitudinal section further defining an inclined outer surface at an acute angle with respect to said longitudinal axis of said metal insert;
said plurality of connection assemblies being embedded in said connection section so as to cause said joining portions of said metal inserts to be accessible from said front face of said connection section;
said connection assemblies being arranged in an inner row closer to said inner surface of said connection section and an outer row closer to said outer surface of said connection section and so as to cause said inclined outer surface of said transition material of the connection assemblies of both said inner row and said outer row to contribute to a decrease in wall thickness of said connection section;
an outer prefabricated part comprising a cured plastics material in which is embedded a plurality of said connection assemblies of the outer row and an inner prefabricated part comprising a cured plastics material in which is embedded a plurality of said connection assemblies of the inner row; and,
said inner prefabricated part and said outer prefabricated part being mutually connected by an adhesive bond.

2. The wind turbine rotor blade element of claim 1, wherein said transition material includes a core material of one of a wooden material or a foamed material.

3. The wind turbine rotor blade element of claim 1, wherein said transition material comprises at least one of the following: a fiber reinforced plastics material and a pultruded material.

4. The wind turbine rotor blade element of claim 1, wherein each one of said plurality of connection assemblies has at least one layer of a fiber material surrounding said metal insert thereof and said transition material corresponding thereto.

5. The wind turbine rotor blade element of claim 4, wherein said at least one layer of fiber material is wrapped around said metal insert and said transition material.

6. The wind turbine rotor blade element of claim 1, wherein the wind turbine rotor blade element is one of the following: a spar cap, a shell member, a longitudinal section of a spar cap, a longitudinal section of a shell member and a prefabricated connection part adapted to be integrated into a wind turbine rotor blade.

7. The wind turbine rotor blade element of claim 1, wherein the wind turbine rotor blade element includes a prefabricated part including a cured plastics material in which is embedded one of a group of elements including: (i) a plurality of said connection assemblies of said inner row; (ii) a plurality of said connection assemblies of said outer row; (iii) a plurality of said connection assemblies of both said inner row and said outer row; and, (iv) all of said plurality of connection assemblies.

8. The wind turbine rotor blade element of claim 7, wherein each one of said group of elements is combined with further fiber material.

9. The wind turbine rotor blade element of claim 1, wherein at least one of:
 i) at least one layer of a triaxial fiber lay-up is arranged at said outer surface of said connection section;
 ii) at least one layer of a triaxial fiber lay-up is arranged at said inner surface of said connection section; and,
 iii) at least one layer of a triaxial fiber lay-up is arranged between said connection assemblies of said outer row and said connection assemblies of said inner row.

10. The wind turbine rotor blade element of claim 1, wherein an intermediate laminate is arranged between said connection assemblies of said outer row and said connection assemblies of said inner row; and, said intermediate laminate has a thickness in a range of 10% to 50% of an outer diameter of said metal inserts.

11. The wind turbine rotor blade element of claim 1, wherein at least one of:
 i) a spacer element is arranged between three adjacent connection assemblies;
 ii) a spacer element is arranged between the inner surface of the connection section and two adjacent connection assemblies of the inner row; and,
 iii) a spacer element is arranged between the outer surface of the connection section and two adjacent connection assemblies of the outer row.

12. The wind turbine rotor blade element of claim 11, wherein said spacer element has a triangular cross section.

13. The wind turbine rotor blade element of claim 1, wherein said transition material has a conical proximal end fitted into a complementary opening of said metal insert.

* * * * *